United States Patent
Skowronski

(10) Patent No.: US 6,926,130 B2
(45) Date of Patent: Aug. 9, 2005

(54) PORTABLE DOCKING STATION AND CORD REEL ASSEMBLY

(75) Inventor: Richard E. Skowronski, North Hampton, NH (US)

(73) Assignee: Restech, Inc., North Hampton, NH (US)

( * ) Notice: Subject to any disclaimer, the term of this patent is extended or adjusted under 35 U.S.C. 154(b) by 0 days.

(21) Appl. No.: 10/476,847

(22) PCT Filed: May 8, 2001

(86) PCT No.: PCT/US01/14869

§ 371 (c)(1),
(2), (4) Date: Nov. 3, 2003

(87) PCT Pub. No.: WO02/093708

PCT Pub. Date: Nov. 21, 2002

(65) Prior Publication Data

US 2004/0129522 A1 Jul. 8, 2004

(51) Int. Cl.⁷ .............................................. H02G 11/02
(52) U.S. Cl. ............................... 191/12.2 R; 191/12.4; 320/115
(58) Field of Search ................................ 320/114, 115; 191/12.4, 12 R, 12.2 R, 12.2 A; 379/454, 455

(56) References Cited

U.S. PATENT DOCUMENTS

| | | |
|---|---|---|
| 2,678,779 A | 5/1954 | Bellmer |
| 2,979,576 A | 4/1961 | Huber |
| 3,715,458 A | 2/1973 | Bayes et al. |
| 3,773,987 A | 11/1973 | Davis et al. |
| 3,853,285 A | 12/1974 | Woodring |
| 4,520,239 A | 5/1985 | Schwartz |
| 4,558,270 A * | 12/1985 | Liautaud et al. ............ 320/110 |
| 4,773,032 A * | 9/1988 | Uehara et al. .............. 708/134 |
| 5,490,213 A * | 2/1996 | Huang ......................... 379/442 |
| 5,657,841 A | 8/1997 | Morvan |
| 5,659,236 A * | 8/1997 | Hahn ......................... 320/111 |
| 5,689,171 A | 11/1997 | Ludewig |
| 5,754,625 A | 5/1998 | Shimura |
| 5,819,893 A | 10/1998 | Wagner et al. |
| 5,939,860 A * | 8/1999 | William ..................... 320/114 |
| 5,977,747 A * | 11/1999 | Huang ........................ 320/115 |
| 6,059,081 A | 5/2000 | Patterson et al. |
| 6,223,871 B1 | 5/2001 | Steffen |
| 6,230,860 B1 * | 5/2001 | Wu ....................... 191/12.2 R |
| 6,253,893 B1 | 7/2001 | Chi-Min |
| 6,255,800 B1 * | 7/2001 | Bork .......................... 320/115 |
| D449,974 S | 11/2001 | Stekelenburg |

* cited by examiner

Primary Examiner—Mark T. Le
(74) Attorney, Agent, or Firm—Greer, Burns & Crain, Ltd.

(57) ABSTRACT

A portable docking station and cord reel assembly (10), made for hand held electronic devices (12), includes a housing (20), a spool (22) rotatably mounted in the housing (20), a cradle (36) mounted on the spool (21), adapted to receive an electronic device (12) and in electrical communication with the electronic device (12), and at least one cable (26) at least partly carried by the spool (22) and in electrical communication with the cradle (36).

27 Claims, 8 Drawing Sheets

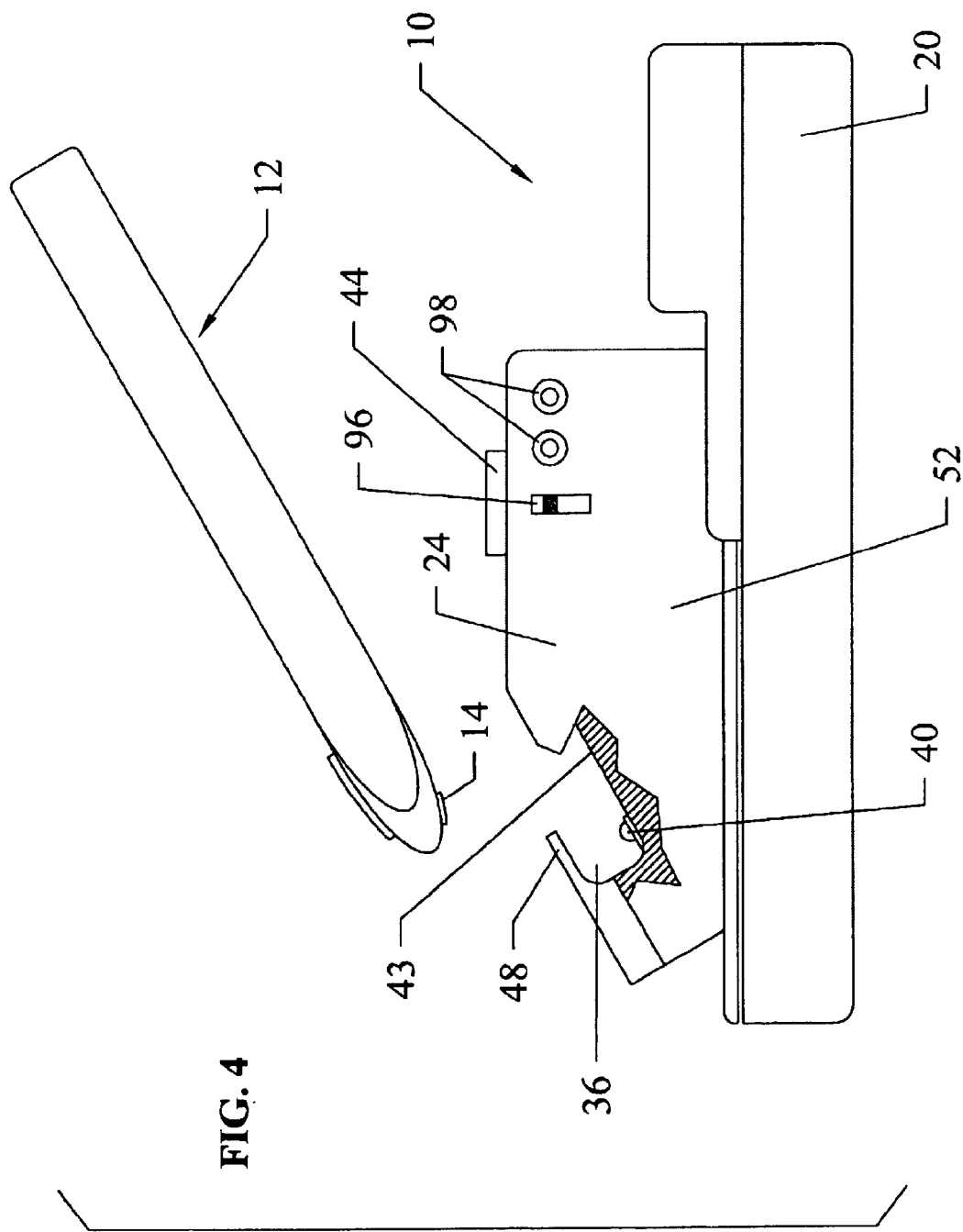

PORTABLE DOCKING STATION AND CORD REEL ASSEMBLY

FIELD OF THE INVENTION

This disclosure relates to a docking station with a cradle for use with a Personal Data Assistant, cellular phone or other hand-held electronic devices. More specifically, it relates to a docking station with improved cord storage.

BACKGROUND OF THE INVENTION

A modern businessperson commonly carries a plethora of small electronic devices. For example, a salesperson may carry a laptop computer, a Personal Data Assistant ("PDA"), such as the PALM® Handheld, a cellular phone, a pager, electronic note pad, and a wireless internet device so that he can do sales presentations, make calls, send and receive e-mail and keep in touch with his office while on a road trip. Internal rechargeable batteries power these devices. These devices are highly desirable due to their portability, which is directly related to their size and weight. Even though breakthroughs in computer technology have enabled manufacturers to miniaturize nearly all the computer components, advances in battery technology have been relatively slow, resulting in little change in the size and weight of the batteries.

The batteries in a typical PDA or cellular phone will power the unit only for a few hours of continuous use, which is inadequate for a normal businessperson. Manufacturers prefer smaller batteries because it allows them to market a smaller, more desirable product, but power capacity (battery life) is sacrificed. As a result, users of these devices carry their battery chargers or electrical adapter with them wherever they travel, and connect the device to high voltage power whenever possible.

Businesspersons commonly bring their laptop computers, cellular phones and PDAs everywhere they go during the workday, to meetings and sales calls, etc., as well as home at night and on trips. This means they also bring all of the electrical adapters for all of the devices everywhere they go. Manufacturers of these devices have been very innovative in improving the portability of the devices, but little effort has been allotted into improving the portability of the electrical adapters that are taken everywhere these devices travel.

PDAs generally use two cords, one for power and another for a link with a data source or destination. A docking station is most often used for recharging the PDA, providing ports for the data link and line power. The docking station holds the PDA in a somewhat upright position in a cradle, so that the keys and display are accessible to the user during recharging or data transfer. This causes the docking station to be generally tall and wedge-shaped, making it awkward to fit in a briefcase. Contacts in the cradle provide power and data transfer from the PDA to and from the docking station without the need for even more cords. Similar docking stations are sometimes used for cellular phones. Phone cradles generally use only one cord for power, but a data port could be used, for example, with a cellular modem on a laptop computer or portable fax machine.

When a person leaves the office to go home or on a trip, he will simply pick up the device, but then must unplug the adapter and manually (sometimes randomly) coil the cord or cords around his hand or around the adapter. If a coiled cord is placed on a table or in a brief case, it will begin to uncoil as soon as it is let go. The lack of portability of an electrical adapter is very much out of sync with the excellent portability of the devices they power.

Thus there is a need for improvements in the portability of adapters, power units, docking stations and other electrical components used with these hand held devices. Further, there is a need for a convenient method of transporting and storing the cords used with such devices.

SUMMARY OF THE INVENTION

These and other problems are solved by the integrated docking station and retractable cord reel assembly of the present invention. A portable docking station and cord reel assembly, made for hand held electronic devices, includes a housing, a spool rotatably mounted to the housing, a cradle on the spool, adapted to receive an electronic device and in electrical communication with the electronic device, and at least one cable at least partly carried by the spool and in electrical communication with the cradle. Preferably, there are contacts on the cradle that are in electrical communication with the cable.

This invention is most advantageous when there are two or more cables that are releasably coupled as both cables are wound together onto the spool. A releasable method of coupling the cables includes nesting the first and second cables together. One method for nesting of the cables includes providing one of the cables with a longitudinal cavity so that the other cable is nested into the cavity when the cables are wound together. As exemplified in the specific embodiments below, many modifications may be made for particular applications.

One particular embodiment comprises a nested cable and cord reel assembly designed with the docking station for a hand-held computer or personal data assistant, and the cables attached to it. The assembly comprises a housing, a spool mounted for rotation in the housing; a docking station carried by the spool, a power cable and a data cable, each having a first end connected to the docking station and being windable onto and off of the spool. The power cable has at least one longitudinal cavity, such that the data cable is releasably nested in the cavity of the power cable when the two cables are co-wound together on the spool. The free end of the power cable has a plug for connection to a standard electrical outlet. The free end of the data cable has a plug or other connector adapted for connection to another electronic device, such as a laptop computer. The housing may include pocket(s) or chamber(s) for internally storing the plugs or connectors.

This invention is also useful for other electronic devices, such as cellular phones. A nested cable and cord reel assembly is suitable to store both a cord delivering power from a standard outlet and a cord connected to another device such as a cellular modem. The invention could also be used in a "hands-free" system for automobile use whereby the two cables connect the cellular phone to a small headset as well as to an automobile power adapter.

In the retracted state, the plugs are inside the cord reel housing or against the side of the housing, and are easily accessible to the user. The user pulls the cable to extract the desired length of cable. When two or more cables are nested together when wound on the spool, approximately equal lengths of each cable are dispensed from the spool regardless of which cable is pulled. All or part of the cable stowed on the spool may be extracted.

After use, the cord is retracted into the cord reel assembly for neat storage and portability. Many of known methods can be used to retract the cable. A spring may be incorporated to bias the spool in the cord retracting direction, and a ratchet can be used to hold the cables in the extended position until retraction is desired. A motor or hand crank can also be used to retract the cables.

In the consumer market where cost is a major consideration, the cord can be manually retracted by turning the docking station housing while holding the cord reel housing. Since the spool is attached to the docking station housing, turning the docking station housing causes the spool to rotate and the cables to retract.

BRIEF DESCRIPTION OF THE DRAWINGS

FIG. 4 is a side view of the embodiment of FIG. 3 with optional jacks, showing the PDA just prior to installation into the cradle, with a portion of the housing cut away to show the contacts;

DETAILED DESCRIPTION OF THE INVENTION

Figure 1:
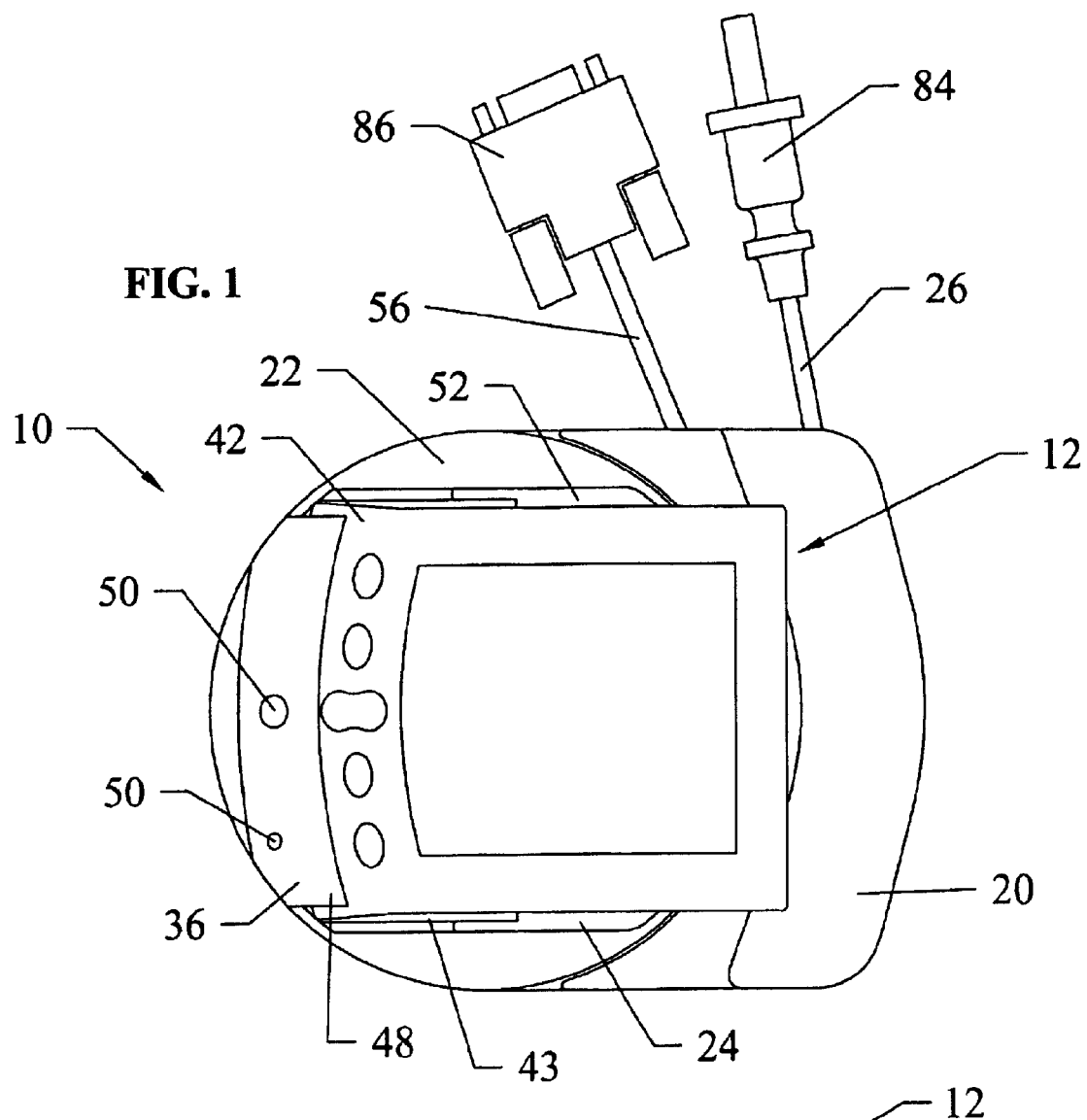
FIG. 1 is a top view of the integrated docking station and cord reel with a personal data assistant in the cradle.

Referring now to FIG. 1, a portable docking station and cord reel assembly, generally 10, is described for hand held electronic devices. The docking station assembly 10 of this invention is applicable to a large number of electronic hand-held devices, generally 12, that are currently popular. Any such device that has electrical contacts 14 (FIG. 3) or jacks for recharging of the device 12, transfer of data, connection of the hand-held device with another device, and the like, are suitable for use with the present docking station assembly 10. These devices 12 include, but are not limited to personal data assistants, electronic notebooks, electronic organizers, hand held computers, cellular phones, electronic pagers, bar code and other hand-held scanners, wireless internet devices and similar portable devices that require at least one cord for either power, recharging of batteries, data or signal transfer. Frequently these devices 12 require two or more cords for recharging the device and for interacting with other devices or a laptop computer 18. References to laptop or personal computers are intended as examples only, and are intended to include any electronic data storage or computing device and/or communications device.

The following discussion is directed to one preferred embodiment where the docking station assembly 10 is designed for use with a PDA, such as a PALM®Handheld personal data assistant. It is to be understood that a unit of this type is suitable for use with many hand-held electronic devices 12, such as cellular phones, pagers, electronic note pads, hand-held computers, wireless internet devices, radios, scanners, bar code readers, and the like. Adaptations, such as changing the shape of the cradle to accommodate different devices 12, are considered to be within the scope of this invention.

Figure 5:
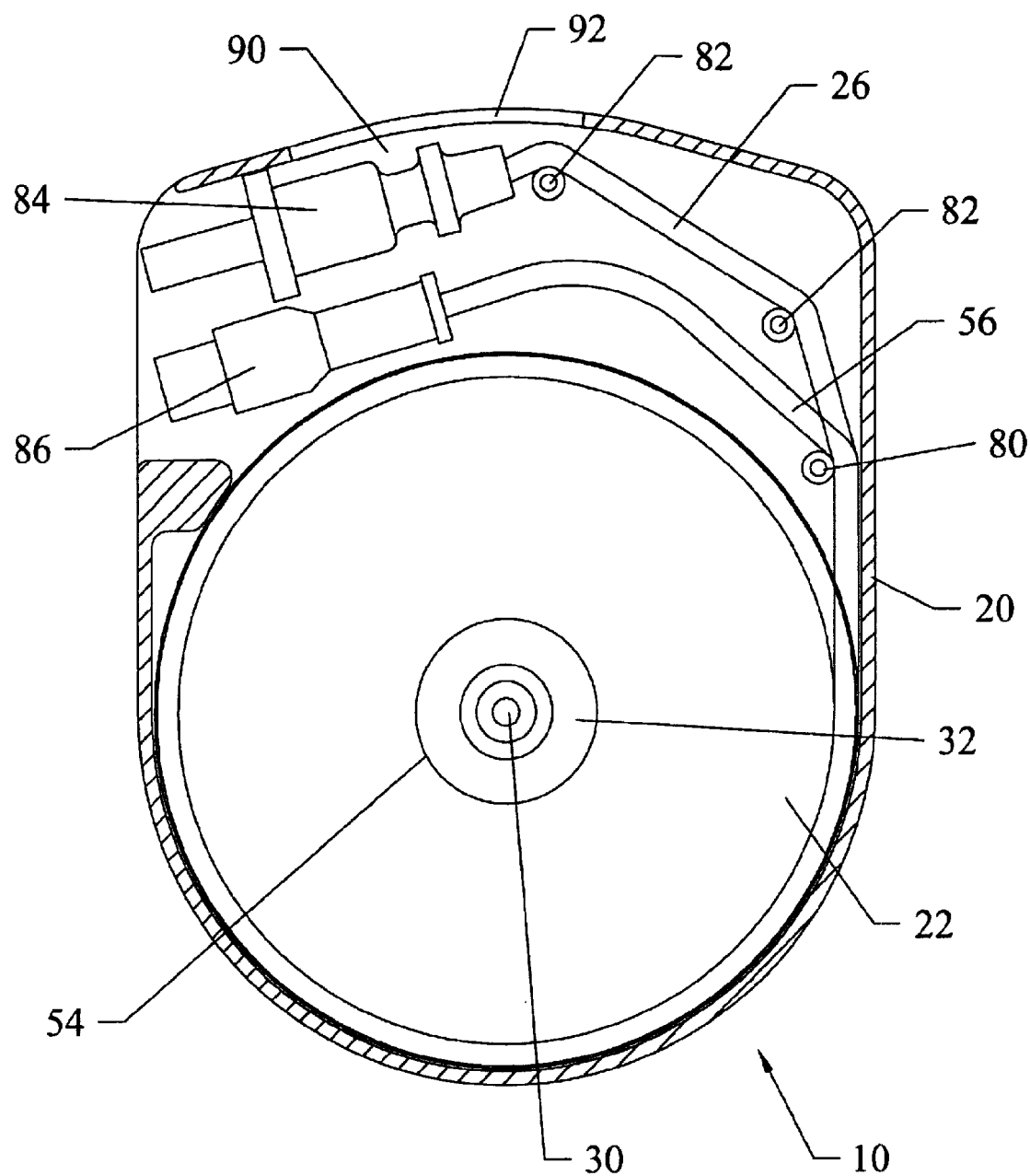
FIG. 5 is a top cross-sectional view of the present invention with a portion of the housing cut away to show the spool and guides.

Referring to FIGS. 1 and 5, the docking station has a cord reel housing 20, a spool 22, an electrical adapter housing 24 and at least one cable 26. The spool 22 is rotatably mounted inside the housing 20, and is sized and configured to hold at least a portion of the cable 26 inside the housing 20 for storage. An axis bolt 30 through the hub 32 holds the spool 22 in place at the axis of rotation. The presence of the spool 22 also helps to weight down the docking station assembly 10, making it more stable and less likely to tip.

Any spool or cord reel assembly is suitable for use with this invention. The details of mounting a spool 22 for rotation within a housing 20, and retraction means, such as springs, are known in the art. See for example, Burke U.S. Pat. No. 5,094,396, the disclosure of which is hereby incorporated by reference. The spool 22 is preferably rotated manually, by turning the electrical adapter housing 24 relative to the housing 20, but the use of springs or power units to assist rotation of the spool is also contemplated.

A friction control device 34 is optionally used between the spool 22 and the housing 20 with any of the embodiments to prevent the cable 26 from unwinding at inopportune times. When all of the cables are retracted, if there is very little friction in the rotation of the spool 22, the spool may partially unwind, for example, as a result of the elasticity of the polymer insulation being bent as it wraps around the spool during the winding process. Use of a friction control device 34 minimizes any unwinding tendency after the winding was complete, or between turns of a manually wound unit. Other mechanisms known in the art, such as ratchets or detents, can also be used.

Friction control devices 34 of this type are well known in the art, for example, suitable friction may be applied by a belleville or wave spring washer on the spool 22 by the axis bolt 30. However, these friction devices 34 concentrate loads over small areas, which is undesirable on plastic moving parts. The most preferred friction control device 34 is a resilient laminated washer that is made up of a resilient polymer or polymer foam, including, but not limited to polyurethane, polyester, silicone, neoprene or PVC bonded between two thin metal washers. In the alternative, the resilient polymer and one washer can be bonded directly to the base of the spool 22. As the axis bolt 30 is tightened, the laminated washer 34 is compressed, controlling the amount of friction between the spool 22 and the housing 20. Use of a flat washer adjacent the housing 20 distributes the load over the entire surface of the washer.

Figure 2:
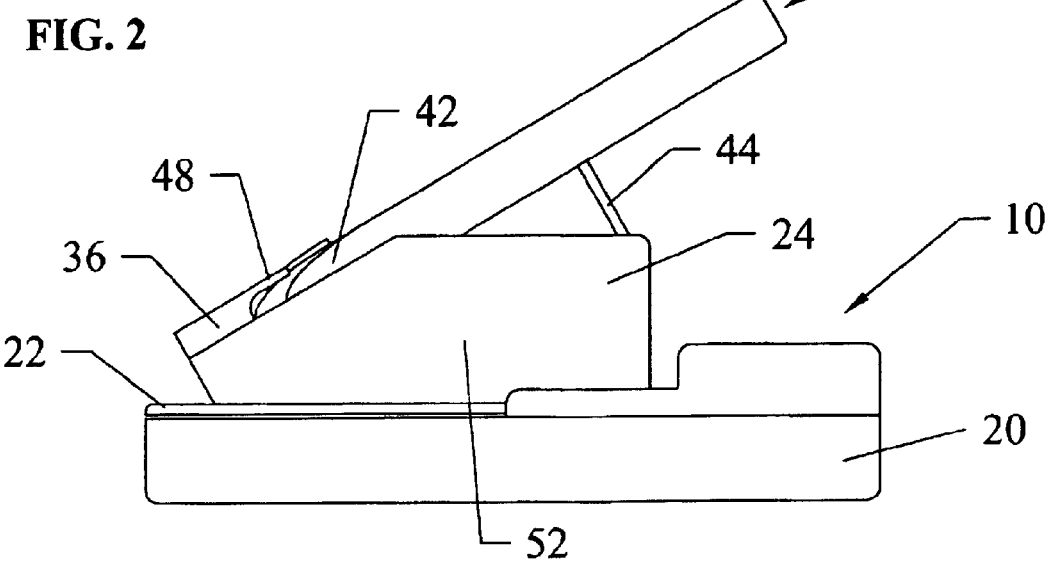
FIG. 2 is a side view of the first embodiment.
Figure 3:
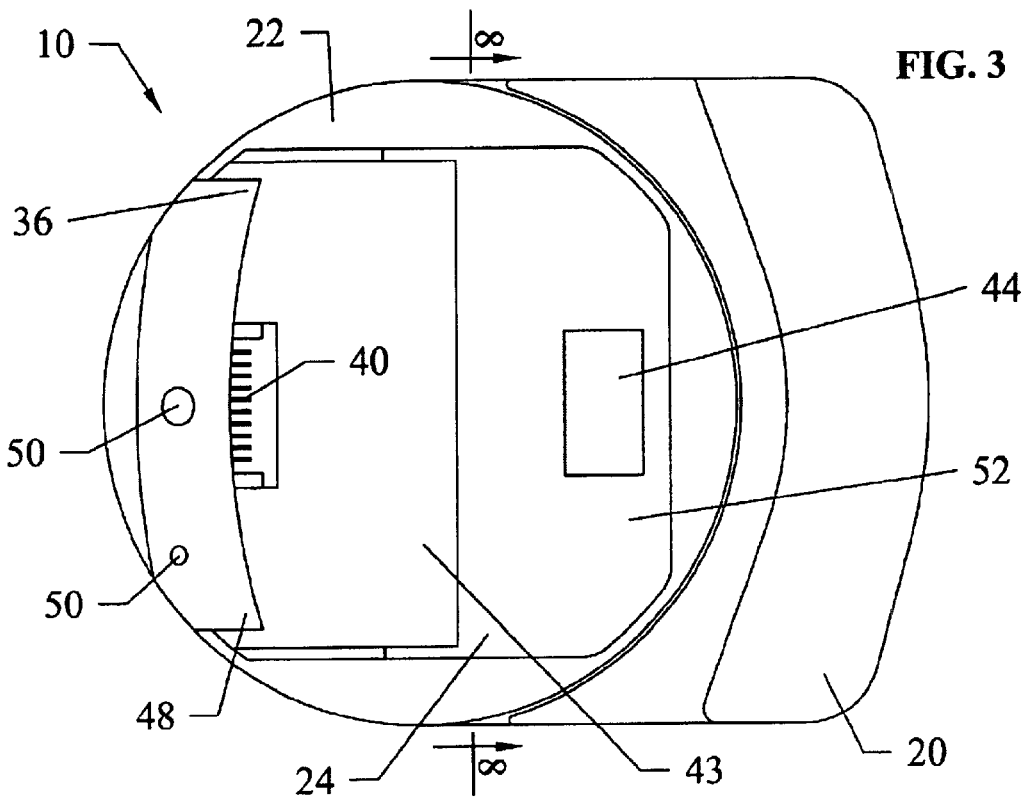
FIG. 3 is a top view of the first embodiment.

Referring now to FIGS. 2 and 3, the electrical adapter housing 24 is mounted on the spool 22, and is configured and arranged to receive the electronic device 12 in a cradle 36. The cradle 36 is designed to matingly engage with the electronic device 12, and hold it securely in a position whereby contacts 14 on the electronic device are in electrical communication with the cradle. Preferably the cradle 36 has contacts 40 that are electrically connected to the cables 26, however it is also possible to use electrical coils, antenna, infra-red, or other non-contact means known in the art. Generally, the bottom 42 of the device 12 is rounded, and the cradle 36 has a corresponding arc shape, however, any shape may be used that securely holds the device. Preferably, the cradle 36 is shaped so that the device 12 seats itself properly in the cradle, even if it is not accurately placed. For example, when the device 12 is rounded and the cradle 36 has a corresponding arc shape, if the device is placed off-center in the cradle, it settles into place due to gravity. Generally, the cradle 36 is shaped as necessary to accept, support and come into electrical communication with the PDA 12.

As shown in FIGS. 1 and 2, the cradle 36 is suitable when formed as an integral part of the power adapter housing 24. However, many additional designs are possible, such as that depicted in an alternate docking station 110 in FIGS. 6 and 7. Like parts are given like numbers as in the previous embodiment. Here, the alternate cradle 146 with a lip 148 is constructed independently, and is mounted so that it pivots with respect to the spool 22 between a deployed position (FIG. 6) and a stowed position (FIG. 7). The shape of the adapter housing 124 is modified to accommodate the cradle 146 in either position. Any cradle 36 configuration is suitably used with any combination of other features.

Figure 13:
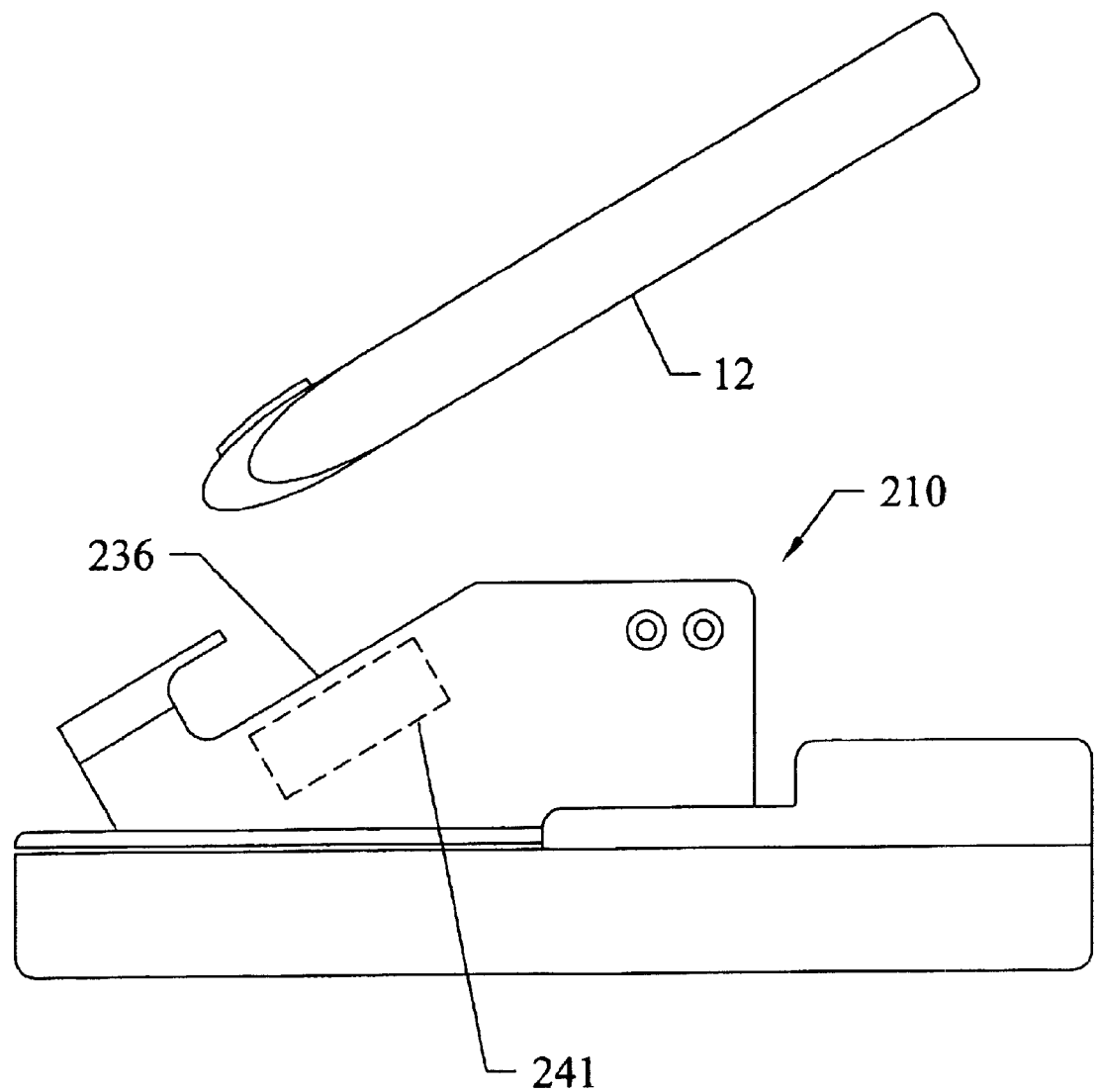
FIG. 13 is a side view of a second alternate embodiment with a non-contact means for electrical communication.

Another embodiment of the docking station, generally 210, is shown in FIG. 13 having a cradle with a non-contact means 241 for electrical communication with the electronic device 12. Element 241, shown in FIG. 13, is provided only as a representation of the existence of an electrical-coil-type non-contact means; however, such representation should not be construed as any indicative of the location and/or configuration of the electrical-coil-type non-contact means.

Preferably, the cradle 36 holds the device in a semi-upright position for convenient use, even while recharging. Generally, the PDA 12 rests against a slanted portion 43 of the adapter housing 24, holding the device 12 at an upward angle. However, other methods of holding the device 12 upright may be used, such as a flip-up device support 44 as shown in FIG. 2, and any techniques, or combinations thereof, may be used. A lip 48 on the front of the cradle 36 helps to prevent the PDA 12 from tilting back and sliding off of the cradle 36. This is particularly useful when the unit is in use during recharging. The lip 48 also includes optional switches and/or indicators 50, such as buttons, lights or light emitting diodes, LEDs, to turn the unit on and/or show when the unit is plugged in, on, actively charging, or any other condition of which the user may wish to be aware.

An electrical adapter 52 rests atop and rotates with the spool 22 and optionally supports the cradle 36. The electrical adapter housing 24 covers the electrical adapter 52, protecting the electrical parts within from the elements, and also protecting the user from inadvertent contact with live electrical components. Space may be conserved by allowing a portion of the power adapter to reside within the hub 32 of the spool 22 (FIG. 5). One of the suitable adapters 52 converts power from AC line current into a low voltage DC source for recharging the batteries of the device 12. Another of the suitable adapters converts 12 volts DC from an automobile to other DC voltages.

The contacts 40 on the cradle 36 pass through the housing 24 to provide electrical communication between the device 12 and the electrical adapter 52 or one or more of the cables 26, 56. Data carried by one or more of the contacts 40 bypasses the adapter 52 and communicates with the data cable 56. One or more of the contacts providing power to the device 12 is electrically communicating with the power cable 26 through the adapter 52. The exact route of electrical communication from the device 12 through the docking station 10 depends upon exactly which adapter 52 is chosen, what cables 26, 56 are used, and with which handheld electronic device the docking station is intended to be used. In some applications, multiple electrical adapters 52 or multipurpose electrical adapters will be used to process electrical signals to and from the device 12 in addition to power conversion.

The docking station assembly 10 also has at least one cable 26 that is at least partly carried by said spool 22 and in electrical communication with one or more of the contacts 40 shown in FIG. 3. At the hub 32 of the spool 22, one end of the cable 26 passes through an inner wall 54 of the spool 22, and connects with the power adapter 52. Preferably, the cable 26 is permanently connected to the adapter 52, and thus provides power regardless of whether the cable is fully or partially deployed, or not deployed at all. Mounting of the adapter 52 on top of the spool 22 allows the adapter to rotate with the spool.

This invention is most advantageously used when two or more cables 26 are used concurrently with the electronic device 12. When batteries are being charged on a PDA 12, often it is desirable to connect the device to a computer at the same time to upload or download data. It then becomes necessary to have a data cable 56 in addition to the power cable 26. The power cable 26 and the data cable 56 are preferably nested and wound together onto the spool 22 for optimum convenience and minimum storage space.

Figure 9:
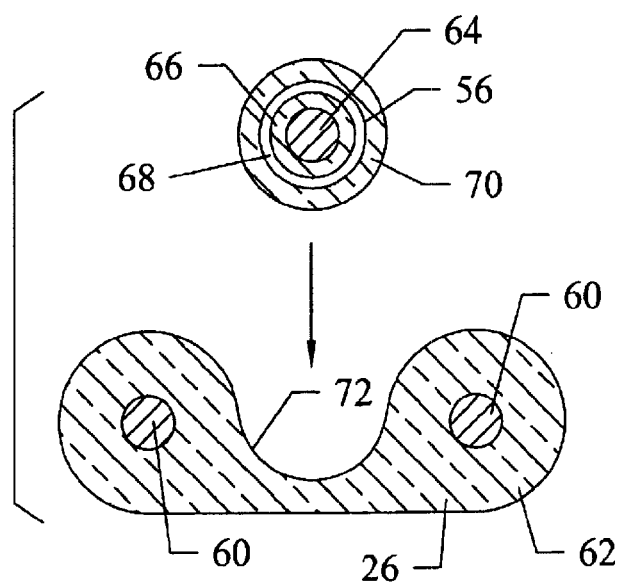
FIG. 9 is a cross sectional view of the cables of the invention, shown in an unnested state.
Figure 10:
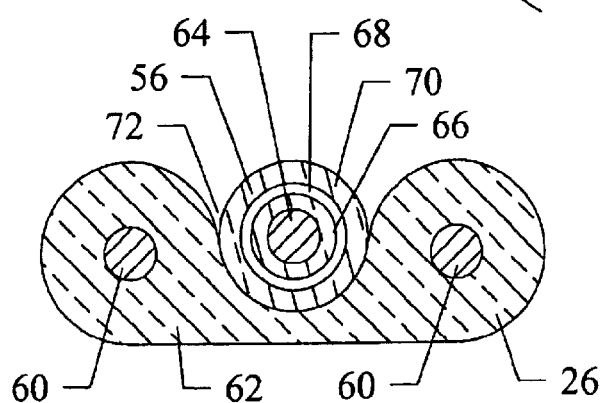
FIG. 10 is a cross sectional view of the cables of FIG. 9, shown nested together.

The power cable 26 has at least two conductors 60 and an insulating jacket 62 as seen in FIGS. 9 and 10. The data cable 56 may comprise a co-axial cable having an inner conductor 64, insulating layer 66, outer conductor 68 and outer jacket 70. The data cable 56 may be of other multi-conductor configurations as well, and is not limited to co-axial. One of the cables is provided with a means for releasably coupling the two cables together when they are cowound together onto and off of the spool 22, as shown in FIG. 10. The power cable 26 has a cavity 72 sized and configured to accommodate the data cable 56 within it. As the cables 26, 56 are co-wound together onto the spool 22, the data cable 56 fits inside the cavity 72, conserving space. The preferred form of coupling is nesting one cable with the other. Other forms of coupling means may be used, such as a tongue and groove or lateral displacement of the cavity 72 to couple cables together side-by-side. In the preferred nesting means, at least one of the cables 26, 56 is provided with at least one longitudinal channel or cavity 72 formed by a gap between the conductors on one of the cables 26, 56 adapted to receive the other cable nested within the cavity.

Although shown in a particular nesting configuration, a large number of nesting configurations, including variations that have the data cable 56 along side the pair of high voltage conductors 60 are possible. Many such configurations are shown and described in International PCT Application No. PCT/US01/03368, previously incorporated by reference.

Both cables 26, 56 are wound on the spool 21, with the data cable 56 stowed in between the two high voltage power conductors 60. This nesting of the data cable 56 into the power cable 26 allows both low and power cables to be wound together, minimizing the space required to stow the cable. Other spools that lay one flat cable on top of the other (e.g., Peterson U.S. Pat. No. 4,646,987) work well only with very thin cables. Thick cables appropriate for power transmission would result in a spool of very large diameter if stacked in this manner.

When wound on the spool 22 the longitudinal cavity 72 in the power cable 26 optionally faces either inwardly, toward the center of the spool 22 (shown in FIG. 8), or outwardly, toward the side walls of the housing 20. Preferably, the cavity 72 faces inwardly, so that when the cables 26, 56 are dispensed, the power cable 26 is on the outside. To extend the cables 26, 56 from the docking station 10, most users pull on the outside cable. In this configuration, the power cable 26 is most likely to be pulled and is better able to withstand the stress because it is generally a thicker, heavier cable than the data cable 56.

Figure 8:
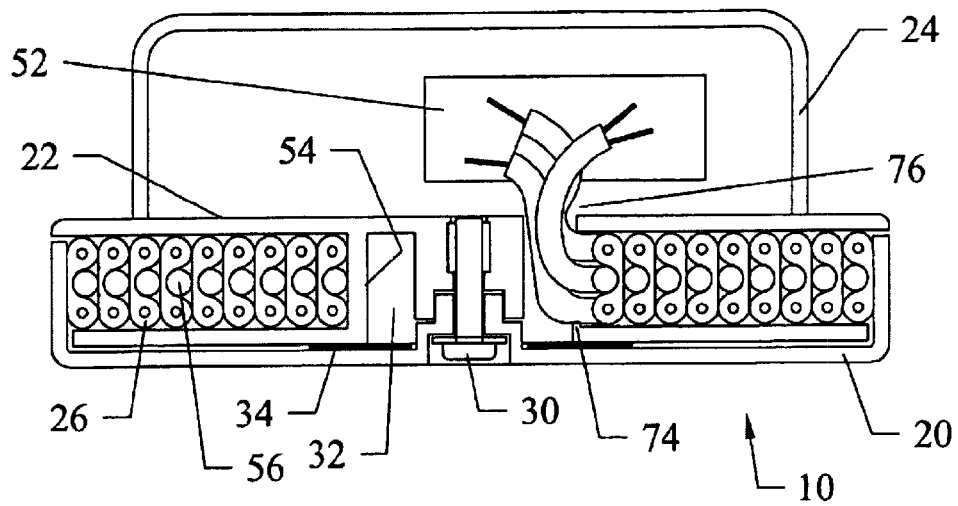
FIG. 8 is a cross sectional view of the first embodiment taken along line 8—8 of FIG. 3.

Referring now to FIG. 8, both cables 26, 56 are connected to the electrical adapter 56 at or near the hub 32 of the spool 22. Preferably, the cables 26, 56 are routed through one or more radial openings 74 on the cord winding surface 54 of hub 32, then routed through one or more axial openings 76 in the spool 22 for connection to the power adapter 56. Optionally, one or more axial openings (not shown) are provided in the spool 22 in the cable winding area adjacent hub 32 to connect the cables 26, 56 into the power adapter 52, bypassing the interior of hub 32.

In the preferred configuration, the cord reel housing 20 will have cord guides and/or rollers 80, shown in FIG. 5, to guide the cables 26, 56 into their nested position so they neatly lie flat together as they are wound on the spool. As the individual cables 26, 56 are fed between a plurality of cord guides 80, or a single cord guide and another stationary element, such as the housing 20, the two cables are guided together into the nested position on retraction of the cables 26, 56 onto the spool 22 due to the limited spacing between the guides. One or more separating guides or rollers 82 are optionally added to separate the cords 26, 56 as they are retracted onto the spool 22. If cords 26, 56 become tangled during use, the separating guide roller 82 prevents the tangled cords from getting stuck in the nesting guides 80. The separating guide 82 can also serve to separate the nested cables 26, 56 from each other as they are extended from the spool and to act as a stop to block inward movement of a free end of the cable 26, 56, each of which has an electrical connector, such as a line plug 84, as the cable is retracted into the housing 20. This keeps the plug 84 in the proper place where it is conveniently reached by the user, allowing him to easily pull the plugs 84, 86 and cables 26, 56 from the housing 20 for the next use.

FIG. 5 illustrates a housing embodiment having a pocket or chamber 90 for storing the line plug 84 and data plug 86 when not in use. Often, the line plug 84 is molded onto the power cable 26 as an integral part of it. The plug 84 neatly fits into the housing 20. In this embodiment, the storage chamber 90 for the line plug 84 and data plug 86 are located in line with the path followed by the cables 26, 56 as they are retracted into the docking station assembly 10. As retraction of the cables 26, 56 is completed, the plugs 84, 86 are drawn into the cord reel housing 20 and into the storage chamber 90 without separate handling by the user.

Another embodiment of the present invention is envisioned in which the storage chamber 90 is located beside the path followed by the cables 26, 56 as they are retracted into the docking station assembly 10. As retraction of the cables 26, 56 is completed, the plugs 84, 86 are drawn close to the cord reel housing 20 and manually fit into the storage chamber 90 for storage.

An optional opening 92 shown in FIG. 5, in the side of the housing 20 allows access to the plugs 84, 86 when the cables 26, 56 are fully retracted into the housing. A lever, button, slide or other mechanism (not shown) may also be employed to push or pull the plugs 84, 86 out of the housing 20. Where it is not desirable to store the plugs 84, 86 inside the housing 20, guides 80, 82 are additionally used to prevent the plugs 85, 86 from being retracted too far into the housing 20.

Either in addition to or instead of a data cable 56, a low voltage power cable 93 is optionally included with the docking station assembly 10 for the purpose of using the single electrical adapter 56 to recharge batteries on multiple electronic devices 12. Electrical adapters 52 are often made with multiple voltage outputs, in the range of 1.5 to 12.0 volts DC, and are therefore capable of charging many different devices. Thus, the docking station assembly 10 could be configured to charge a PDA 12 at the cradle at the same time a laptop computer 18 was recharged with the low voltage cable 93.

Figure 11:
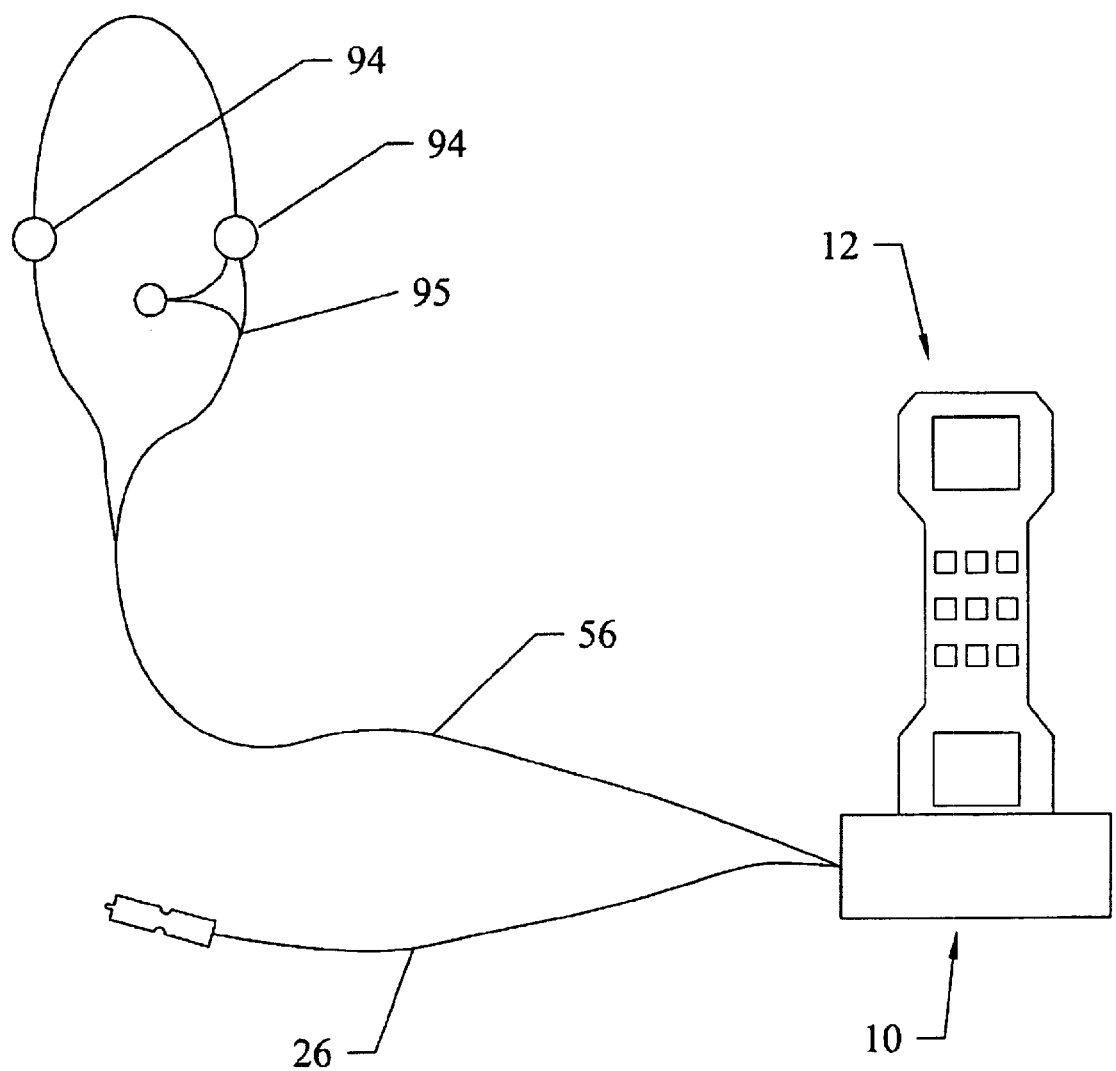
FIG. 11 is a diagram of a hands-free system for use in an automobile using a docking station to supply power to a cellular phone through a 12-volt automobile plug and a headset with speakers and a microphone.

FIG. 11 depicts one use of the docking station 10 for "hands free" use of a cellular phone, as when driving. The device 12 is a cellular phone that is recharged in the cradle 36 while data is sent to the user via speakers 94 or microphones 95 or a headset containing both. A small headset may be used that has earphones and a microphone so that the cellular phone does not have to be held to the user's face.

The docking station assembly 10 optionally includes a switch 96 to enable selecting the desired voltage. The selector switch 96 is configured to control voltage to the low voltage cable 93, a supplemental jack 98, or both. The supplemental jack 98 provides low voltage power from the adapter 52 to an optional supplemental cable 99. Connectors on the ends of the supplemental cable 99 are selected depending on the devices with which it is used, but preferably the cable is adapted to connect with the laptop computer 18 at one end and the jack 98 at the other end. Additional jacks 98 can be provided for data communication, if desired, either in addition to or instead of low power jacks.

Figure 12:
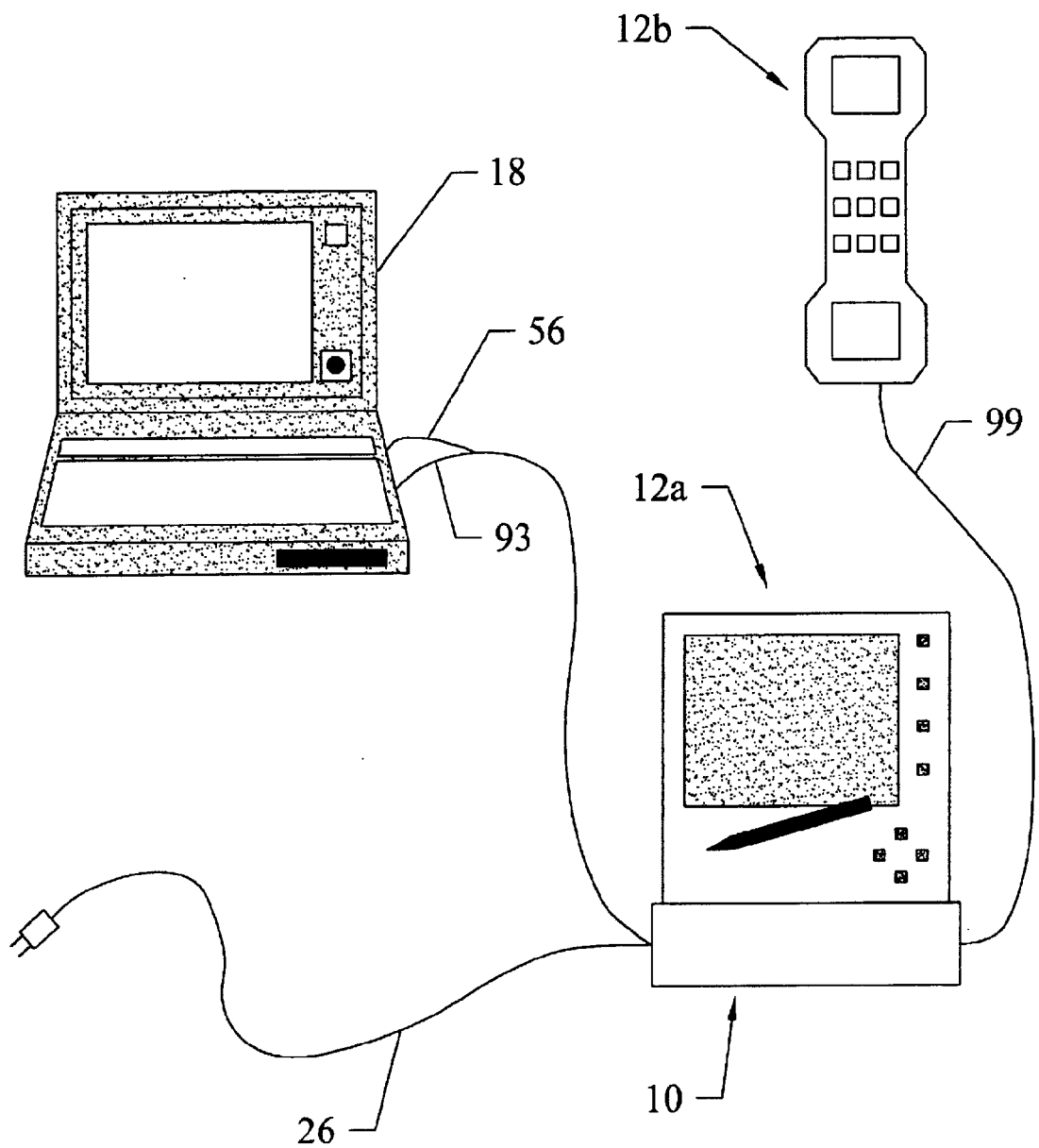
FIG. 12 is a diagram showing the docking station with PDA installed receiving power through a high voltage cable, providing both low voltage power and data to a laptop computer, and providing low voltage power to a cellular phone through a supplemental cable.

As best seen in FIG. 12, the docking station assembly 10 is suitable for use with separate plug-in cables to charge yet additional devices 12 such as a cellular telephone 12b. Using the docking station 10 of this invention, a businessperson could connect the docking station assembly 10 to a wall socket with the retractable line cable 26, charge a cellular phone 12b via the supplemental low voltage cable 99 through a supplemental jack 98, charge a PDA 12a at the cradle 36, and connect the PDA to a laptop computer IS with a retractable data cable 56. It is also contemplated that the data cable 56 and low voltage cable 93 could be combined into a single cable. Combining the data cable 56 and low voltage cable 93, the single combination cable could recharge and communicate with the computer 18 simultaneously. Alternately, the separate data cable 56, low voltage cable 93 and other cables can all be nested into the power cable and cowound on the spool.

Figure 6:
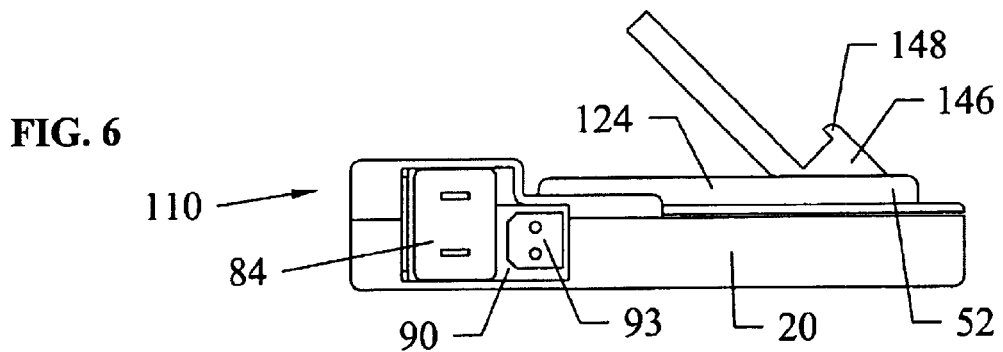
FIG. 6 is a side view of an alternate embodiment of the invention with a pop-up cradle in the deployed position.
Figure 7:
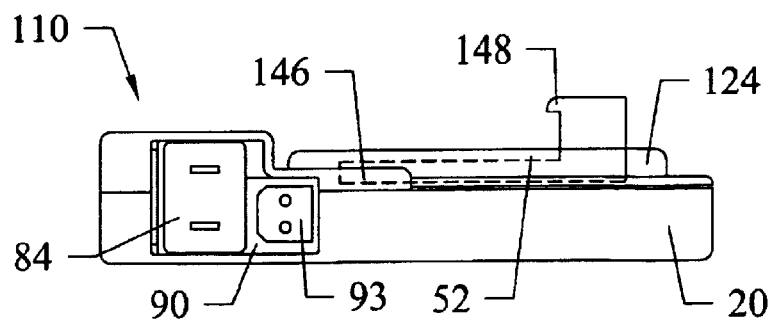
FIG. 7 is a side view of the embodiment of FIG. 6, shown with the cradle in the stowed position.

Although the low voltage cable 93 is shown with an alternate embodiment in FIGS. 6 and 7, any combination of cables is suitable for use with any housing configuration or any type of cradle.

The addition of doors, covers, latches or other optional mechanisms can be added if desired. Preferably, items such as these are omitted in order to minimize complexity, cost and the number of parts that are susceptible to breakage. However, addition of such features is also considered to be within the scope of the present invention.

Accordingly, the integrated docking station and cord reel assembly 10 of the invention is a compact device that conveniently stores the low voltage, high voltage, and/or data cables inside the housing. It can also house optional electrical components. It provides a facile solution to long-standing problems in the art.

Although a docking station assembly 10 has been shown and described in a preferred embodiment, other electronic means may be used in other applications, such as a signal amplifier for electronic signal cables. These and other routine modifications of the docking station and cord reel assembly of the invention will occur to those skilled in the art. All such modifications and adaptations are intended to be covered by the appended claims.

What is claimed is:

1. A portable docking station and cord reel assembly for a portable electronic device, comprising
    a) a housing;
    b) a spool rotatably mounted to said housing;
    c) a cradle on said spool, adapted to receive the electronic device and in electrical communication with the portable electronic device, wherein said cradle is mounted for rotation with said spool as a unit relative to said housing; and
    d) at least one cable at least partly carried by said spool in electrical communication with said cradle.

2. The portable docking station of claim 1, wherein said cradle pivots with respect to said spool between a deployed position and a stowed position.

3. The portable docking station of claim 1, wherein said docking station is configured to receive one of a personal data assistant, an electronic notepad, a hand-held computer, an electronic data storage device and a cellular phone.

4. The portable docking station of claim 1, wherein said at least one cable comprises a first cable and a second cable.

5. The portable docking station of claim 4 further comprising a means for releasably coupling said first cable to said second cable when said first and second cables are co-wound together onto said spool.

6. The portable docking station of claim 5, wherein said means for releasably coupling said first cable to said second cable comprises providing one of said cables with at least one longitudinal cavity, and wherein the other said cable is nested into said cavity on retraction of said cables on said spool.

7. The portable docking station of claim 1 further comprising a flip-up device support.

8. The portable docking station of claim 1, further comprising a friction control device between said spool and said spool housing.

9. The portable docking station of claim 1, further comprising one or more supplemental power supply jacks mounted on said housing.

10. The portable docking station of claim 4, wherein said first cable comprises a power cable and said second cable comprises a data cable.

11. The portable docking station of claim 4, wherein said cradle comprises one or more contacts electrically connected to said first cable and one or more contacts are electrically connected to said second cable.

12. The portable docking station of claim 5, further comprising at least one cord guide member mounted to said housing for guiding said first cable and said second cable together on retraction of said cables onto said spool.

13. The portable docking station of claim 5, further comprising at least one separating guide mounted to said housing for separating said first cable and said second cable from each other on extension of said cables from said spool.

14. The portable docking station of claim 5, wherein said first and said second cables have free ends, each free end having an electrical connector, and wherein said housing includes at least one chamber for said connectors.

15. The portable docking station of claim 1 further comprising a plurality of contacts on said cradle in electrical communication with said cable.

16. The portable docking station of claim 15 further comprising an electrical adapter carried by said spool and in electrical communication with one or more of said contacts.

17. A portable docking station and retractable cord reel assembly comprising:
    a) a cord reel housing;
    b) a spool mounted for rotation in said housing;
    c) a cradle mounted on said spool, configured and arranged to removably receive a portable electronic device, said cradle having a plurality of contacts adapted for electrical communication with the electronic device;
    d) a first cable having a first end adapted for electrical communication with one or more of said contacts, said first cable being windable onto and off of said spool; and
    e) a second cable having a first end adapted for electrical communication with one or more of said contacts, said second cable being windable onto and off of said spool, said second cable being releasably nested with said first cable when said cables are co-wound on said spool.

18. A portable docking station of claim 17 wherein:
    said first cable comprises a power cable and includes at least one longitudinal cavity comprising a gap between two conductors within said first cable;
    said second cable comprises a data cable that nests with said longitudinal cavity of said first cable as said cables are wound on and off said spool; and
    said cradle comprises a power adapter.

19. The portable docking station of claim 17, further comprising a resilient laminated washer.

20. A portable docking station for connecting a personal data assistant and a personal computer comprising:
    a) a cord reel housing;
    b) a spool mounted for rotation in said housing;
    c) a cradle mounted on said spool and adapted to receive the personal data assistant, said cradle having a plurality of contacts for electrical connection with the personal data assistant;
    d) an electrical adapter carried by said spool and electrically connected to said contacts;
    e) a power cable having a first end electrically connected to said electrical adapter and a free end carrying a plug adapted for connection to a power source, said power cable being windable onto and off of said spool; and
    f) a data cable having a first end in electrical communication with said contacts and a free end carrying a plug adapted for connection to a personal computer, said data cable being windable onto and off of said spool.

21. The portable docking station of claim 20, wherein said power cable and data cable are releasably coupled and co-wound together onto and off of said spool.

22. The portable docking station of claim 20 further comprising a jack configured to provide low voltage power and a cable having a first end electrically connected to the personal computer and a second end adapted for connection to said jack.

23. A portable docking station for portable telephone comprising:
    a) a cord reel housing;
    b) a spool mounted for rotation in said housing;
    c) a cradle mounted on said spool and adapted to receive the telephone, said cradle having a plurality of contacts for electrical connection with the telephone;

d) a power cable having a first end electrically connected to said contacts and a free end carrying a plug adapted for connection to a power source, said power cable being windable onto and off of said spool; and e) a headset cable having a first end electrically connected to said contacts and a second end for connection to a headset, said headset cable being windable onto and off of said spool.

24. The portable docking station of claim 23, wherein said headset comprises a speaker, a microphone or a combination thereof.

25. The portable docking station of claim 23, wherein said power cable and said headset cable are adapted to be co-wound together onto and off of said spool.

26. A cradle for an electronic device and retractable cord reel assembly comprising:

a) a cord reel housing;

b) a spool mounted for rotation in said housing;

c) a cradle mounted on said spool for rotation with said spool as a unit relative to said housing;

d) a means for non-contact electrical communication with the electronic device in said cradle; and e) a cable having a first end adapted for electrical communication with said non-contact electrical communication means, said cable being windable onto and off of said spool.

27. The assembly of claim 26 wherein said non-contact electrical communication means comprises an electrical coil.

* * * * *

UNITED STATES PATENT AND TRADEMARK OFFICE
CERTIFICATE OF CORRECTION

PATENT NO. : 6,926,130 B2 Page 1 of 1
APPLICATION NO. : 10/476847
DATED : August 9, 2005
INVENTOR(S) : Richard E. Skowronski It is certified that error appears in the above-identified patent and that said Letters Patent is hereby corrected as shown below:

Column 6, line 58: Delete "21" and replace with --22--.

Column 8, line 43: Delete "IS" and replace with --18--.

Signed and Sealed this

Eighth Day of July, 2008

JON W. DUDAS
*Director of the United States Patent and Trademark Office*